UNITED STATES PATENT OFFICE.

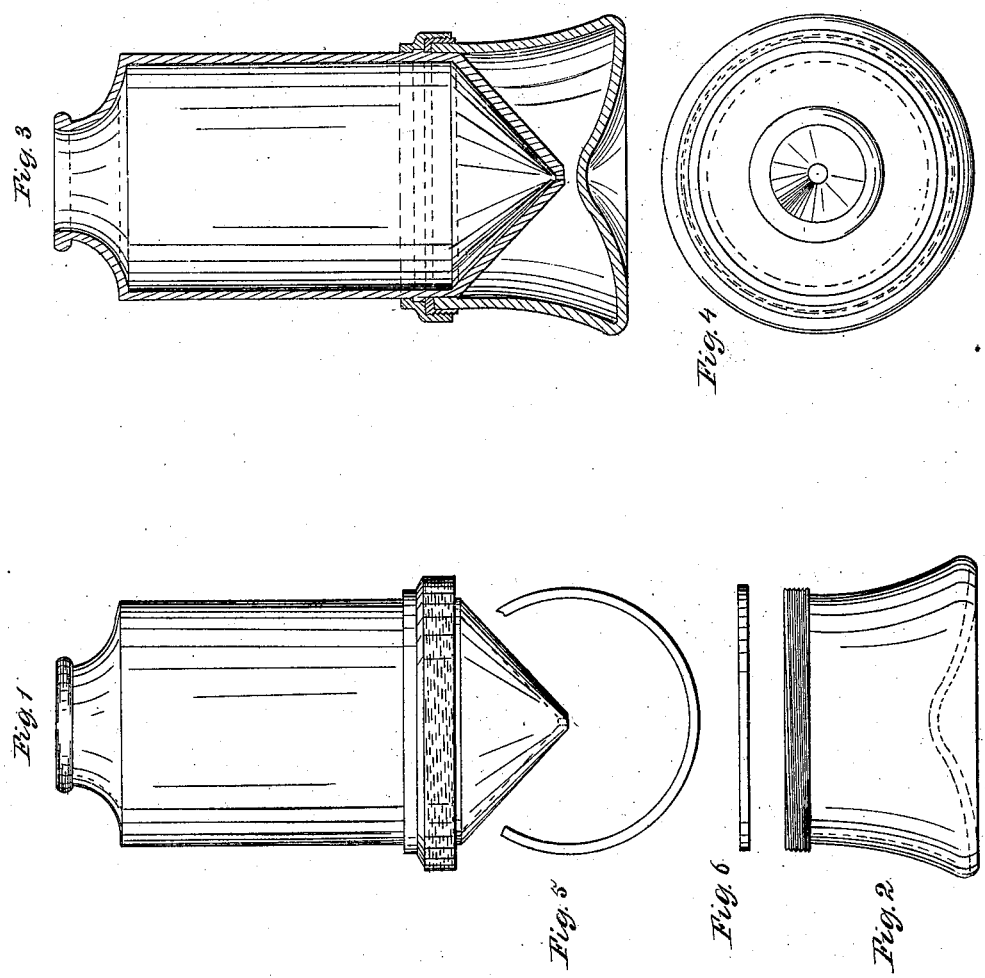

CYRUS H. MORSE, OF NORTH KINGSTON, RHODE ISLAND.

IMPROVED VIAL FOR HOLDING SOLUTIONS.

Specification forming part of Letters Patent No. 55,341, dated June 5, 1866.

*To all whom it may concern:*

Be it known that I, CYRUS H. MORSE, of North Kingston, in the county of Washington and State of Rhode Island, have invented a new and useful Improvement in Vials for Holding Chemical Solutions or other liquids containing sedimentary matter; and I do hereby declare that the following specification, taken in connection with the drawings making a part of the same, is a full, clear, and exact description thereof.

Figure 3 is a view in perspective of the vessel. Fig. 1 is a view of one of the parts of which it is made up. Fig. 2 is a view of the base for the vessel, constituting also the chamber for the collection of sediment. Fig. 4 is a plan. Figs. 5 and 6 are detailed parts to be referred to.

In the accompanying drawings, A, Figs. 1 and 2, represents a vessel of any preferred size, and in the general form of a vial or bottle, with the exception of its bottom, which is funnel-shaped, as shown at B, and has an aperture, $a$, at its lowest point.

C, Figs. 2 and 3, is the base of the vial, and is made in a convenient form for supporting the vessel A in an upright position, and is also made hollow, so as to furnish a chamber for the collection of the heavier particles contained in the fluid which have passed into it through the mouth $a$ of the funnel.

The joint $b\ b$, where the portion A and its base C are joined, should be made sufficiently tight to prevent leakage; and it will also be advisable to make the connection such that the two parts can be separated at pleasure. This can be conveniently effected by means of the screw-collar connection shown in Fig. 3, the portion $c$ being cemented to the glass surface of A, and the portion $d$ to the surface of C. A screw-thread is cut upon the inner surface of $c$, and a corresponding thread upon the outer surface of $d$. A packing-ring, $e$, Figs. 5 and 6, can be placed in the joint between A and B and compressed by means of the screw-collar connection until the joint is tight.

With this improvement the sediment and heavier particles contained in the fluid will have a tendency to pass through the opening $a$ of the funnel and be collected in the chamber B. When the vial is tipped, or even when inverted for the purpose of pouring from its mouth any of its contents, all such sediment will be retained in the chamber and be prevented from mixing with the clear liquid in the vessel A.

What I claim as my invention, and desire to secure by Letters Patent, is—

A vial, bottle, or similar vessel, A, made with a funnel-shaped diaphragm, B, as described, in combination with the chamber C, for the purposes specified.

CYRUS H. MORSE.

Witnesses:
BENJ. F. THURSTON,
WILLIAM W. RICKARD.